(12) United States Patent
Prater

(10) Patent No.: US 6,253,745 B1
(45) Date of Patent: Jul. 3, 2001

(54) MULTIPLE STROKE ENGINE HAVING FUEL AND VAPOR CHARGES

(76) Inventor: David M. Prater, 211 Lowell St., Andover, MA (US) 01810

( * ) Notice: Subject to any disclaimer, the term of this patent is extended or adjusted under 35 U.S.C. 154(b) by 0 days.

(21) Appl. No.: 09/460,827

(22) Filed: Dec. 14, 1999

Related U.S. Application Data

(63) Continuation-in-part of application No. 09/237,328, filed on Jan. 26, 1999.

(51) Int. Cl.⁷ .................................................. F01K 27/00
(52) U.S. Cl. .............................................. 123/543; 60/712
(58) Field of Search .................................. 123/543, 546, 123/197.3, 197.4, 78 BA; 60/712

(56) References Cited

U.S. PATENT DOCUMENTS

| | | |
|---|---|---|
| 1,217,788 | 2/1917 | Liedtke . |
| 1,339,176 | 5/1920 | Dyer . |
| 1,509,622 | 9/1924 | Trent et al. . |
| 1,682,307 | 8/1928 | Porter et al. . |
| 1,711,937 | 5/1929 | Glantz . |
| 2,202,480 | 5/1940 | Campbell et al. . |
| 2,671,311 | 3/1954 | Rohrbach et al. . |
| 3,964,263 | 6/1976 | Tibbs . |
| 4,143,518 | 3/1979 | Kellogg-Smith . |
| 4,433,548 | * 2/1984 | Hallstrom ............................... 60/712 |
| 4,538,557 | 9/1985 | Kleiner et al. . |
| 4,790,284 | * 12/1988 | Ferrenberg ............................ 123/543 |
| 5,429,177 | 7/1995 | Yaron et al. . |

* cited by examiner

Primary Examiner—Marguerite McMahon
(74) Attorney, Agent, or Firm—Mills & Onello LLP

(57) ABSTRACT

A six-stroke cycle engine burns an air-fuel charge for a first power stroke, the exhaust gases being directed to a heat regenerator located in a vapor heating chamber. A second power stroke is produced by injecting fluid directly into the heat regenerator, for generating a second power stroke with the expanded vapor, using the same engine reciprocating mechanism.

26 Claims, 7 Drawing Sheets

MULTIPLE STROKE ENGINE HAVING FUEL AND VAPOR CHARGES

RELATED APPLICATIONS

This application is a continuation-in-part of copending application U.S. Ser. No. 09/237,328, filed Jan. 26, 1999, the contents of which are incorporated herein in their entirety by reference.

BACKGROUND OF THE INVENTION

Six-stroke cycle engines have been proposed wherein the first four strokes function as a conventional internal combustion engine operating on a fuel charge and the fifth and sixth strokes operate on a steam charge. The fuel charge strokes include a standard intake stroke, a compression stroke, a power stroke, and an exhaust stroke. The products of combustion are exhausted from the combustion chamber, and water is injected therein to be converted by remaining heat into steam. The steam charge generates a steam expansion power stroke, and the steam is excised during a steam exhaust stroke.

Past attempts at such an arrangement have met with limited success, generally resulting in configurations of complicated construction and/or low efficiency. Examples include the engine described in U.S. Pat. No. 1,339,176, where the heat of the exhausted products of combustion were entirely lost, resulting in highly inefficient operation. Six-stroke cycle engines of the type shown in U.S. Pat. Nos. 1,217,788 and 2,671,311 relied on steam generating means external of the engine itself for providing the steam for a steam expansion stroke. Such arrangements were complicated and expensive to produce, and introduced additional components through which heat can be lost.

An engine described in U.S. Pat. No. 4,143,518 utilizes the reciprocating mechanism of the internal combustion engine for the steam power stroke and recovers a portion of the heat of the exhausted products of combustion. Such a configuration recovers only a small fraction of this exhausted heat. This is due to inadequate expansion during the steam power stroke and limitations on the maximum steam temperature that could be obtained by conducting the heat from the exhaust products through the cylinder walls. The heat of the exhausted products of combustion is recovered by passing the exhausted products over fins attached to the outside of the cylinder. The heat transferred to the fins is utilized to heat the cylinder wall. A primary limitation in this technique is that the cylinder wall can only be heated to approximately 400 degrees F. without destroying the oil film required to lubricate the piston. This significantly limits the maximum temperature of the steam formed when water is injected into the cylinder. In addition, no provision is made to adequately expand the steam. The expansion ratio of the fuel power stroke is limited to approximately 10:1 due to the characteristics of the gasoline used for a conventional internal combustion engine. This is insufficient for complete recovery of the mechanical work potentially recoverable from the steam during the steam expansion stroke.

The engine described by Hallstrom, U.S. Pat. No. 4,433,548, also utilized the reciprocating mechanism of the internal combustion engine for the steam power stroke. This design only recovers a small fraction of the exhausted heat due to limited expansion of the steam during the steam power stroke. The volume in which the steam is generated includes both the steam generation chamber and the clearance volume between the top of the piston and the cylinder head. No provision is made to minimize the clearance volume at the initiation of the steam power stroke. Therefore the steam expansion ratio is considerably less than the combustion cycle expansion ratio. This significantly limits the efficiency of the steam cycle.

SUMMARY OF THE INVENTION

The present invention is directed to a multiple cycle engine, for example a six-stroke cycle engine, wherein the first four strokes function as a conventional internal combustion engine and include an fuel intake stroke, a fuel compression stroke, a fuel power stroke and an fuel exhaust stroke; and further including additional strokes, namely, a vapor power stroke and a vapor exhaust stroke for generating additional power from heat extracted from the fuel exhaust, in a manner which overcomes the limitations of conventional approaches.

During the fuel exhaust stroke, the products of combustion are directed through a heat regenerator located in a vapor heating chamber adjacent the combustion chamber. Upon completion of the exhaust stroke, fluid is injected directly into the heat regenerator and heated. The vapor is admitted into the combustion chamber to provide a vapor power stroke, which is followed by a vapor exhaust stroke.

In this manner, the present invention provides an engine which efficiently recovers a significant portion of the heat normally rejected by an internal combustion engine and converts this otherwise wasted heat into useful work.

The present invention further eliminates the conventional cooling system for an internal combustion engine while also providing improved cooling for the exhaust valve and other regions of the combustion chamber subject to severe thermal stress.

In one embodiment, the present invention is directed to an internal combustion engine. The engine includes a fuel combustion chamber having an exhaust port at which heated fuel exhaust generated by combustion is released from the chamber. A heat regenerator preferably comprises a heat conductive element configured to promote turbulent flow of the fuel exhaust therethrough. The heat regenerator is in communication with the exhaust port for extraction of heat from the fuel exhaust. A fluid source releases fluid into the heat regenerator where the fluid absorbs heat and is converted to vapor. A valve releases the vapor into the chamber for powering the engine.

In a preferred embodiment, the fluid comprises water and the vapor comprises steam. The released vapor generates a vapor charge in the chamber for powering the engine. The vapor charge follows a fuel charge which likewise powers the engine and produces the fuel exhaust.

In a second embodiment, the fluid source releases a cool, high-pressure vapor into the heat regenerator where the vapor is heated. A valve releases the vapor charge into the chamber for powering the engine. The vapor charge follows a fuel charge which likewise powers the engine and produces the fuel exhaust.

In a third embodiment, the liquid comprises a mixture of water and a hydrocarbon fuel such as methanol or gasoline.

The present invention is further directed to a heat regenerator including a heat conductive element configured to promote turbulent flow of a fluid therethrough. The heat regenerator is adapted to be alternately heated by combustion gas and cooled by vapor heating.

The heat conductive element preferably comprises a plurality of wire mesh elements stacked at the various rotation angles. The wire mesh elements may comprise stainless steel or ceramic. In alternative embodiments, the heat conductive element may comprise sintered metal, open-cell ceramic foam, a metal foil, or a patterned foil wound into an annular shape.

The heat regenerator is preferably coupled proximal to the fuel combustion chamber so as to minimize heat loss during the transfer of combustion gas from the fuel combustion chamber to the heat regenerator and during the transfer of vapor from the heat regenerator to the fuel combustion chamber.

In a preferred embodiment, an exhaust valve controls the release of fuel exhaust from the heat regenerator. The exhaust valve may include a shaft which coaxial with and slidable relative to a shaft of the heat transfer valve. The heat regenerator may be positioned between the exhaust valve and the heat transfer valve. The valves may comprise, for example, poppet valves.

The heat regenerator is preferably enclosed in a vapor heating chamber in communication with the exhaust valve, the fuel source, and the heat transfer valve. The volume of the fuel combustion chamber is preferably controllable such that a first volume of the chamber at the initiation of combustion is different than a second volume of the chamber at the initiation of the release of the vapor. The first and second volumes are preferably controlled by the top dead center position of a piston coupled to an eccentric. Alternatively, the volumes may be controlled by a piston coupled to a multi-link eccentric mechanism. The multi-link eccentric may comprise an eccentric mechanism adapted to be coupled to, and driven by, an engine crank shaft, upper and lower connecting rods, and a lever coupled between the upper and lower rods and the eccentric mechanism. The eccentric mechanism may be rotatably supported by a plurality of shaft bearings. A gearing mechanism may be provided for gearing the eccentric relative to the crank shaft.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
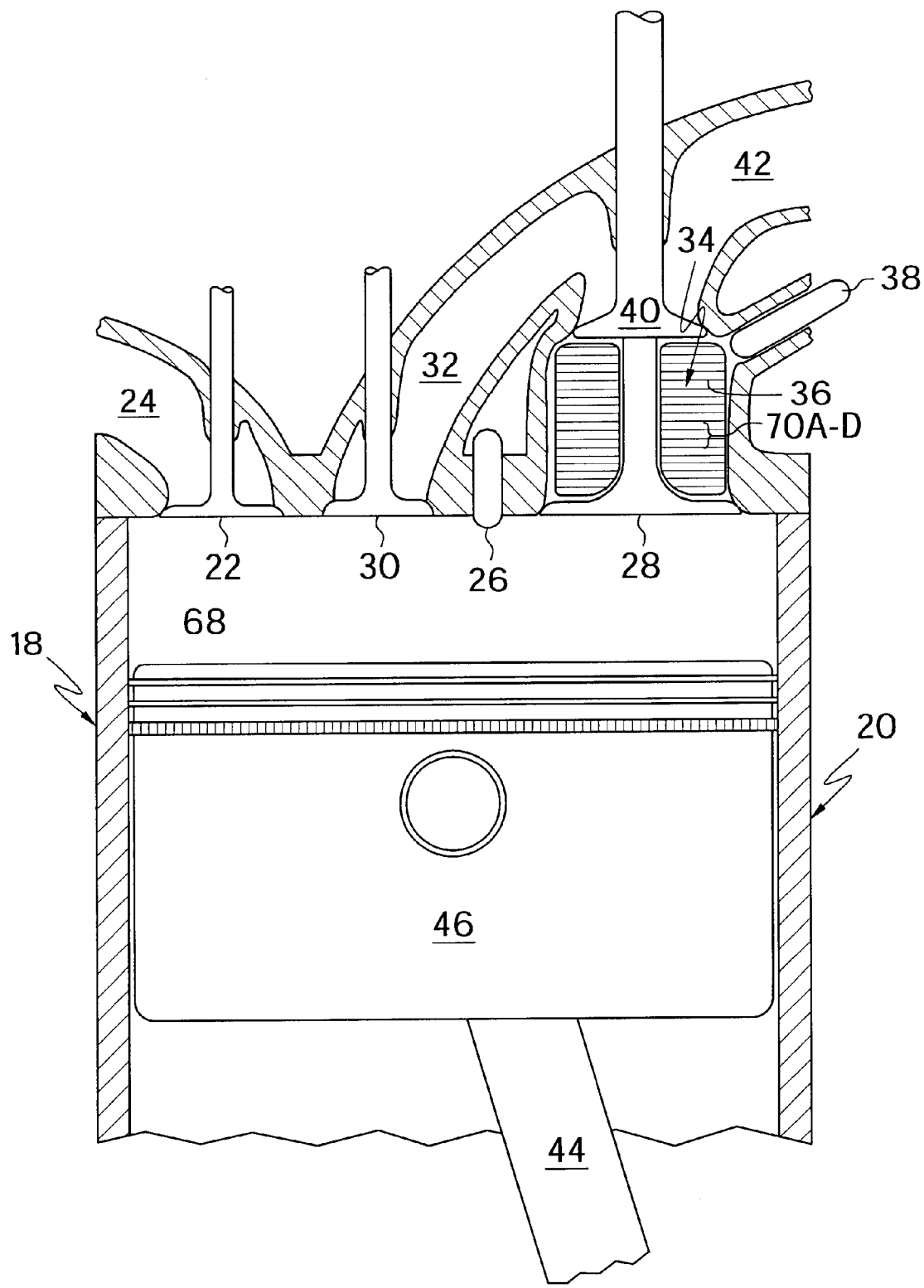
FIG. 1 is a sectional side view of a cylinder including a heat regenerator in accordance with the present invention.

FIG. 1 is a sectional side view of a cylinder 18, for example, one cylinder of a multiple-cylinder engine, where fuel combustion occurs. The combustion region 68 is preferably enclosed by conventional thermal insulation 20.

An intake valve 22 communicating with an intake port 24, a spark plug (or a fuel injection nozzle) 26, a transfer valve 28, and a vapor exhaust valve 30 communicating with a vapor exhaust port 32, are positioned across the top portion of the cylinder. A vapor heating chamber 34 communicates with the cylinder via the transfer valve 28. A heat regenerator 36 is disposed within the vapor heating chamber 34. The vapor heating chamber 34 further includes a fluid injection device 38 and an exhaust valve 40 in communication with an exhaust port 42.

Figure 5:
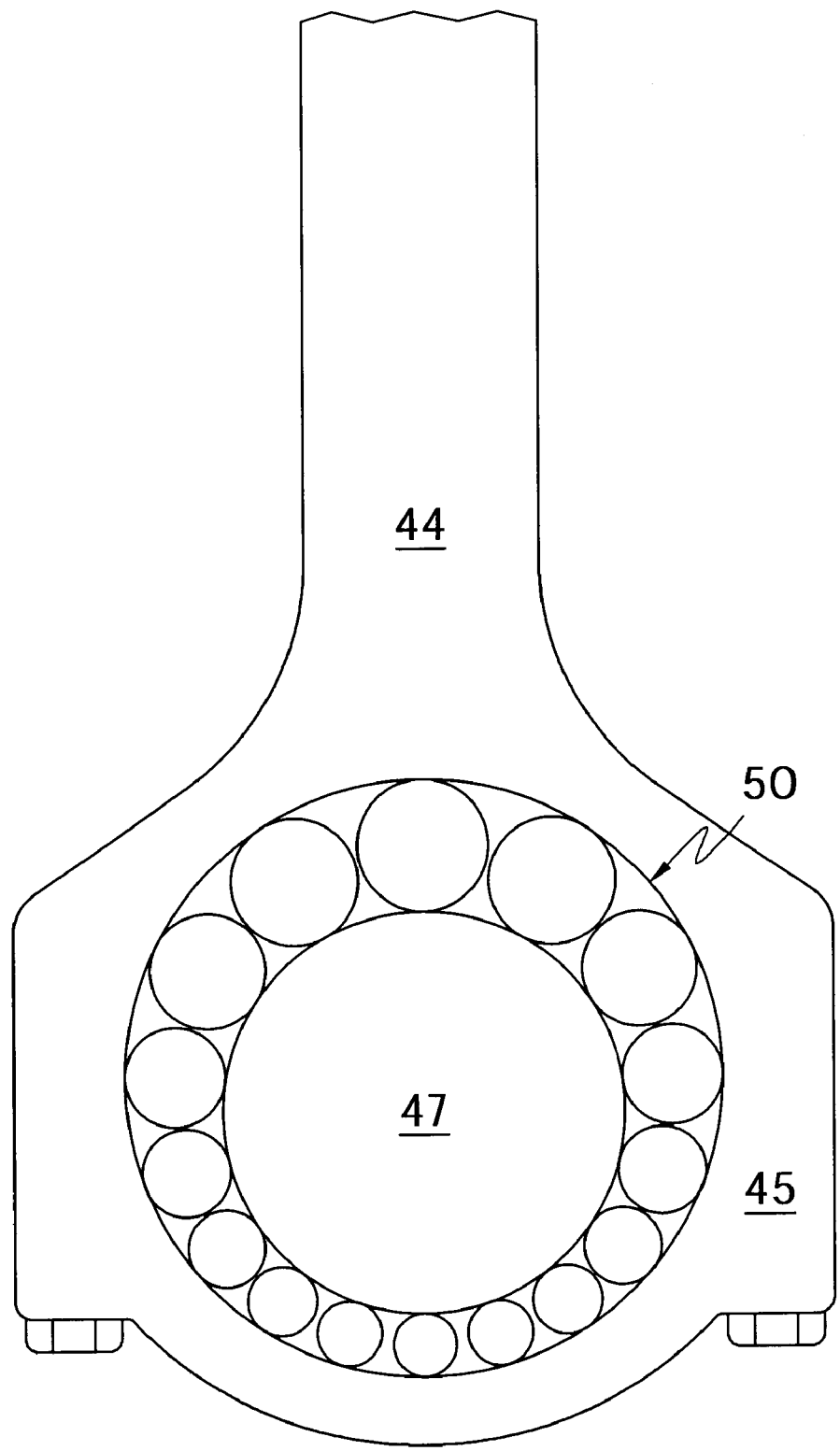
FIG. 5 is a sectional side view of a connecting rod eccentric, in accordance with the present invention.

A connecting rod 44 is shown mechanically coupled to a piston 46 which travels within the cylinder. With reference to FIG. 5, a connecting rod eccentric 50 is located within the connecting rod end 45, coaxial with the crankshaft rod engine journal 47, for controlling the combustion chamber clearance volume during the each instance (for example, three instances in a six-cycle engine) the piston reaches its maximum upward travel, a position referred to herein as TOP DEAD CENTER (TDC). The instances of maximum upward travel are described below with reference to FIGS. 3A–3C.

Figure 6:
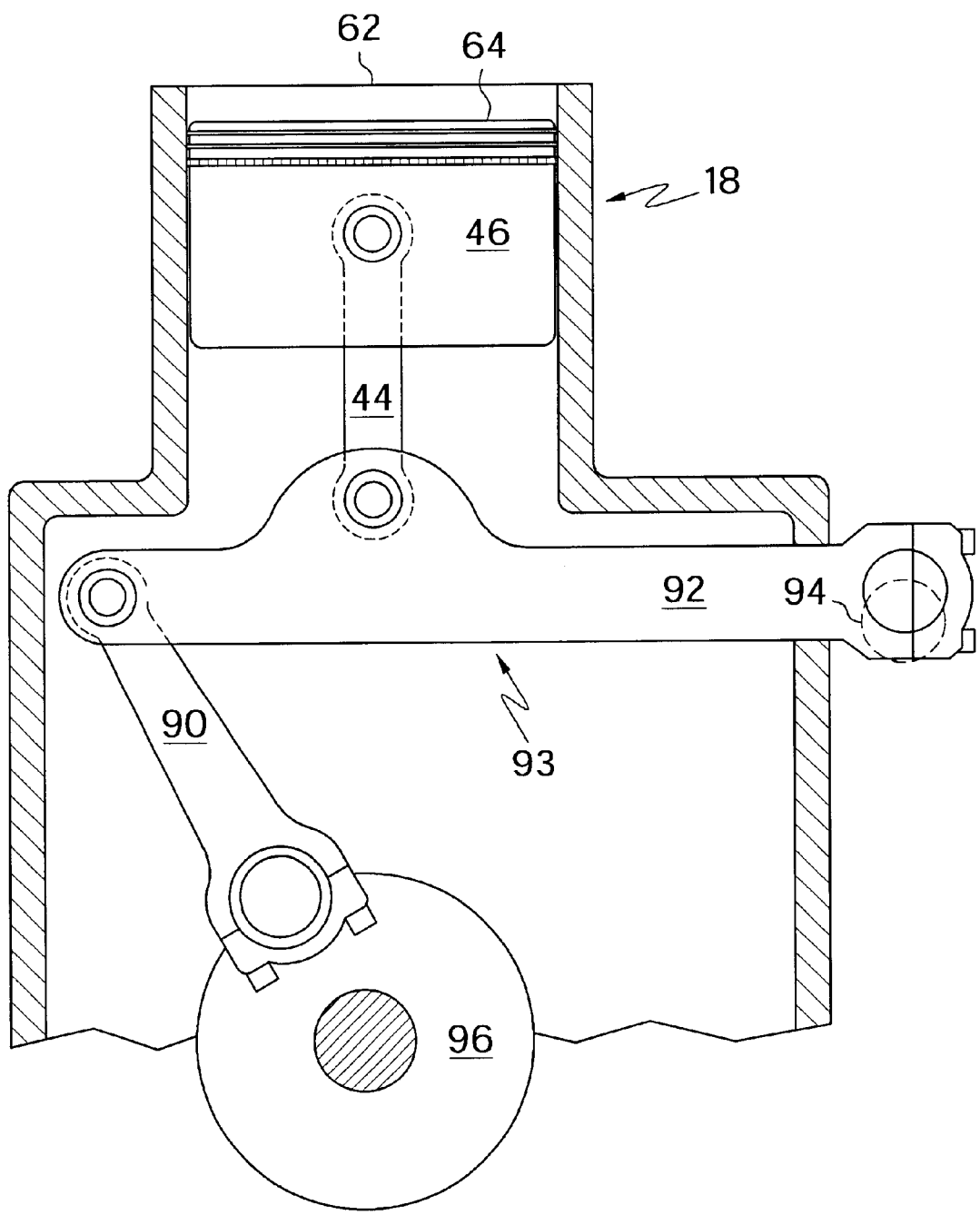
FIG. 6 is a sectional side view of the cylinder of FIG. 1, illustrating a multi-link eccentric configuration, in accordance with the present invention.

In the alternative embodiment of FIG. 6, an upper connecting rod 44 is shown mechanically coupled to a piston 46 which travels within the cylinder 18. A multi-link eccentric 93 consisting of an upper connecting rod 44, lower connecting rod 90, lever 92 and eccentric 94, allows for controlling the combustion chamber clearance volume during each instance (for example three instances in a six-cycle engine) the piston reaches its maximum upward travel, in the TDC position. This offers the advantage of isolating the eccentric 94 from the connecting rod 44, affording improved combustion chamber volume control. This configuration is disclosed in U.S. Pat. No. 4,538,557, issued Sep. 3, 1985 to Kleiner, et al., incorporated herein by reference.

FIGS. 2A–2F are schematic diagrams illustrating the operation of a six-stroke cycle engine in accordance with the present invention, for purposes of illustration. Other cycle configurations are equally applicable to the present invention.

Figure 2C:
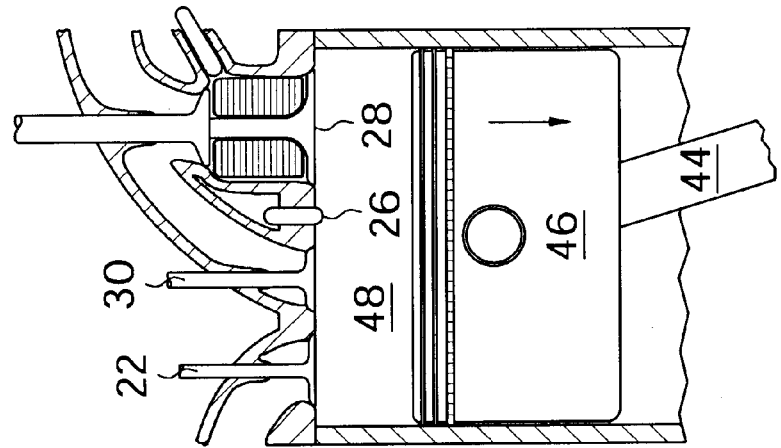
FIGS. 2A–2F are sectional side views of the cylinder of FIG. 1, illustrating the operation of a six-stoke cycle engine in accordance with the present invention.
Figure 2B:
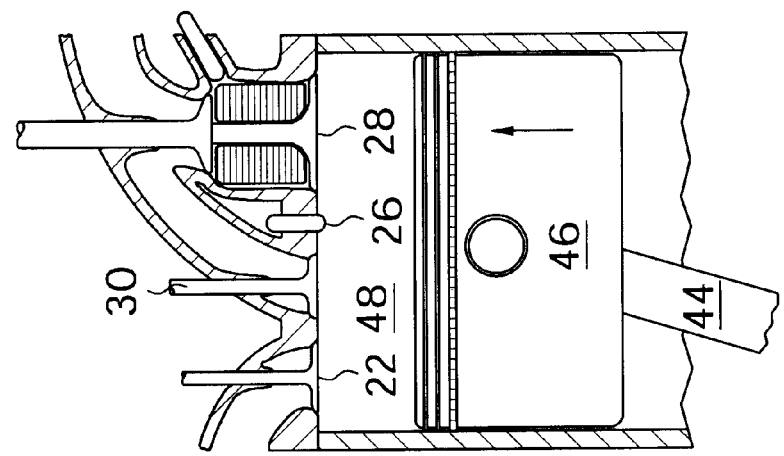
Figure 2A:
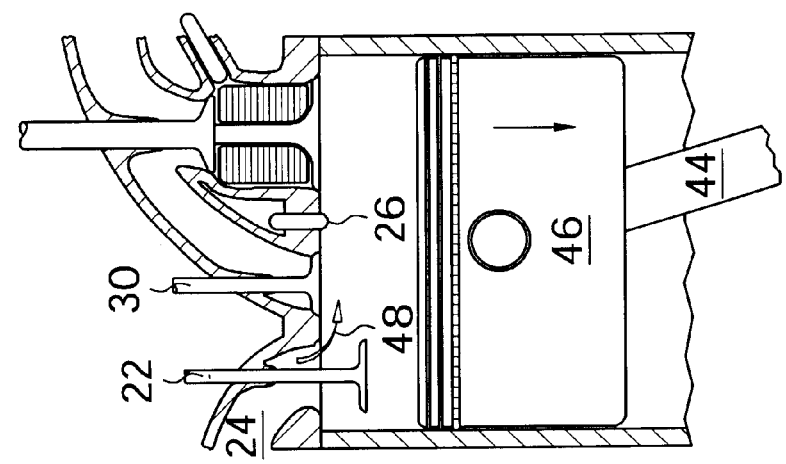

In FIG. 2A, the piston 46 undergoes downward travel as in a conventional four-stroke cycle fuel intake stroke. During the downward travel, air, or an air-fuel mixture 48, is drawn from intake port 24 via the intake valve 22. The transfer valve 28 and the vapor exhaust valve 30 are both closed.

FIG. 2B illustrates the fuel compression stroke, during which the intake valve 22, the transfer valve 28, and the vapor exhaust valve 30 are in a closed position, and the piston 46 undergoes upward travel to compress the air-fuel mixture 48. When the piston reaches the TDC position, upon completion of the compression stroke, the connecting rod eccentric 50 (see FIG. 5) is in a position to produce proper clearance volume in preparation for the fuel power stroke.

In FIG. 2C the piston moves downward as in a conventional four-stroke cycle fuel power stroke. The intake valve 22, the transfer valve 28 and the vapor exhaust valve 30 remain closed. The fuel power stroke is initiated by the spark plug 26 if an air-fuel mixture was drawn into the cylinder, or by the fuel injection nozzle 26 injecting a charge of fuel in the case where only air was drawn during the intake stroke.

Figure 2F:
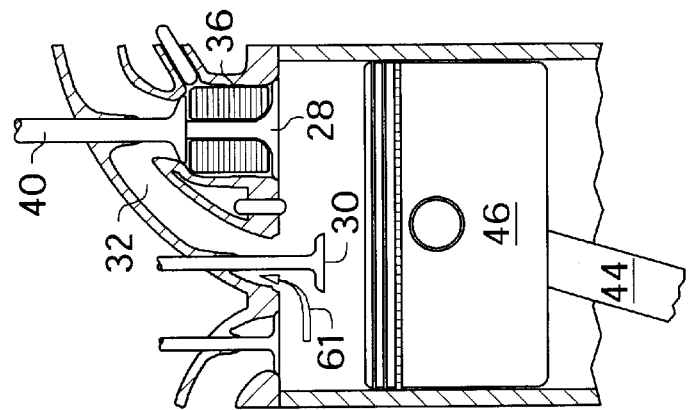
Figure 2E:
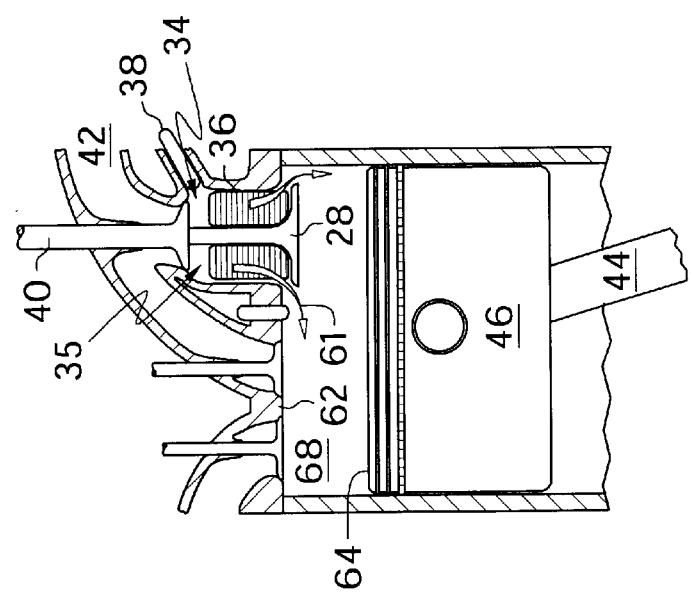
Figure 2D:
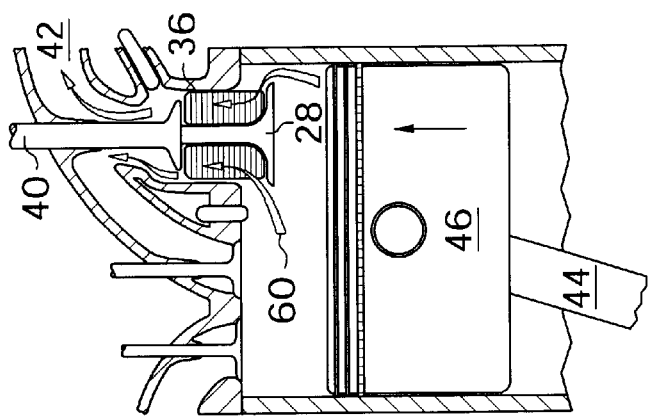

FIG. 2D illustrates upward travel of the piston during the fuel exhaust stroke. The intake valve 22 and vapor exhaust valve remain closed, and transfer valve 28 and the exhaust valve 40 are open and the products of combustion 60 are discharged from the cylinder past transfer valve 28, through heat regenerator 36, past exhaust valve 40 into exhaust port 42. A large portion of the heat of the products of combustion is transferred to the heat regenerator 36, which operates in a counter flow configuration, wherein the products of combustion cool as they pass through the regenerator in a first direction, heating the regenerator channels. Subsequently, a second fluid is heated as it passes through the regenerator in the opposite direction, thereby cooling the regenerator channels. In this manner, a temperature gradient forms across the heat regenerator 36. The hottest products of combustion first contact the hottest portion of the heat regenerator 36. As the gasses cool upon passage through the heat regenerator 36, they contact progressively cooler portions, permitting maximum recovery of heat from the combustion gasses.

In a preferred embodiment, the heat regenerator 36 has no moving parts, and is not in contact with any sliding surface, for example the piston 46. In this manner, the heat regenerator 36 has no need for lubrication and is therefore not subject to the temperature limitations and other shortcomings of lubricants. Note that in the example given in FIG. 2D, the heat regenerator 36 is configured to move with the transfer valve 28. This permits the transfer valve 28 and the exhaust valve 40 to move into an open position together, while maximizing the size of the heat regenerator 36 within the confines of the vapor heating chamber 34. In an alternative embodiment, the heat regenerator 36 may be stationary with respect to the vapor heating chamber 34, and slidable relative to the transfer valve 28. Since the vapor heating chamber 34 must accommodate travel of the exhaust valve 40, this configuration does not amount to optimal utilization of space within the vapor heating chamber 34.

The hottest portions of the heat regenerator can be heated to temperatures approaching the temperature of the products of combustion at the completion of the fuel power stroke. This temperature can be considerably greater than 1000° F. The operating temperature is limited in the present invention only by the material properties of the heat regenerator and the transfer valve. These two components are exposed to the highest sustained temperatures.

Figure 3C:
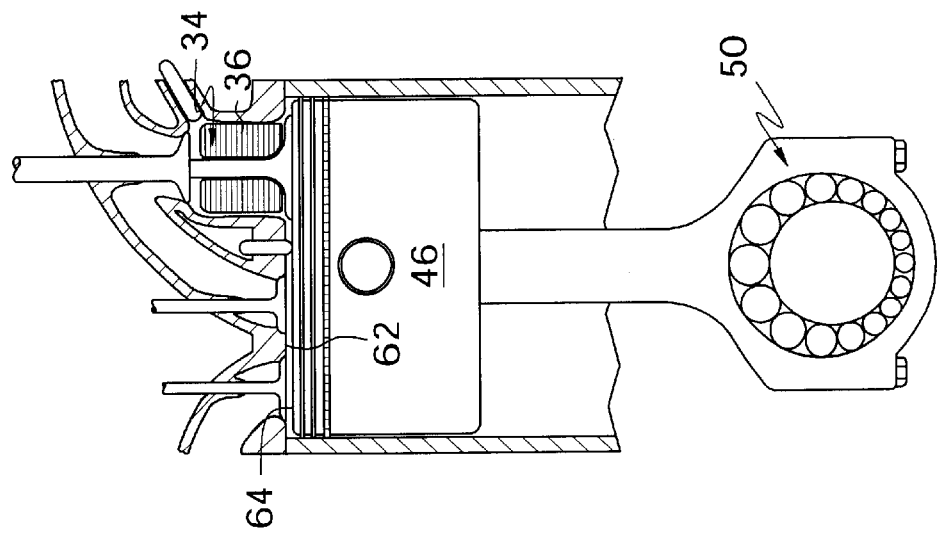
FIGS. 3A–3C are sectional side views of the cylinder of FIG. 1, illustrating the respective positions of the piston and connecting rod eccentric at the top dead center (TDC) position at the end of the vapor exhaust stroke (FIG. 3A), the fuel compression stroke (FIG. 3B), and the fuel exhaust stroke (FIG. 3C), in accordance with the present invention.
Figure 3B:
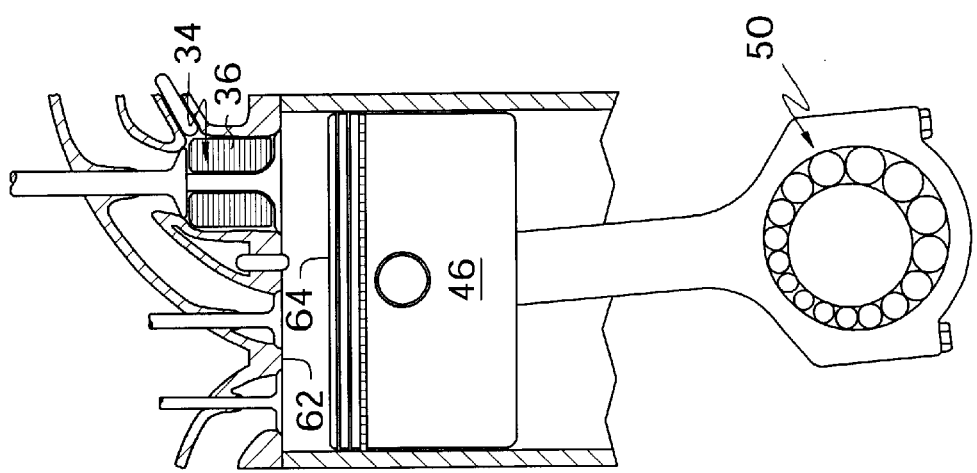
Figure 3A:
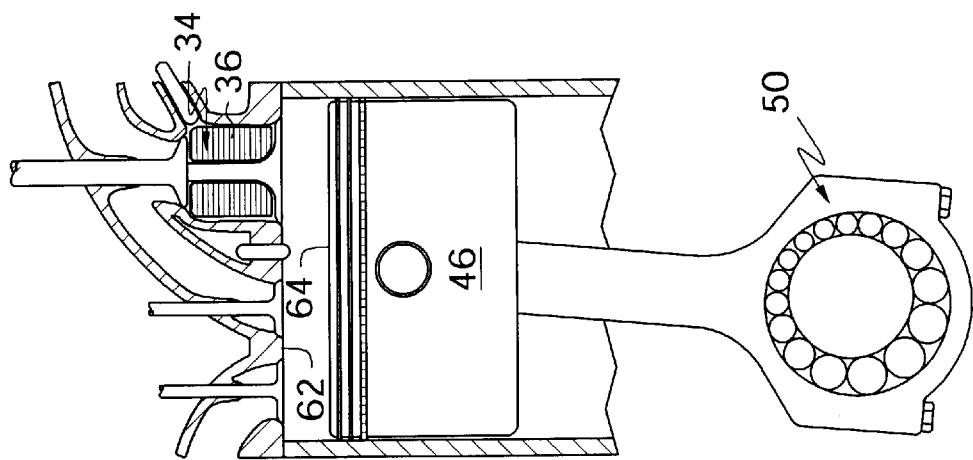
Figure 4A:
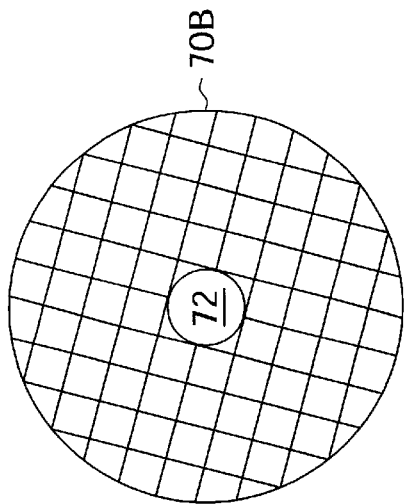
FIGS. 4A–4D are top views of four layers of wire mesh comprising the heat regenerator, in accordance with the present invention.
Figure 4B:
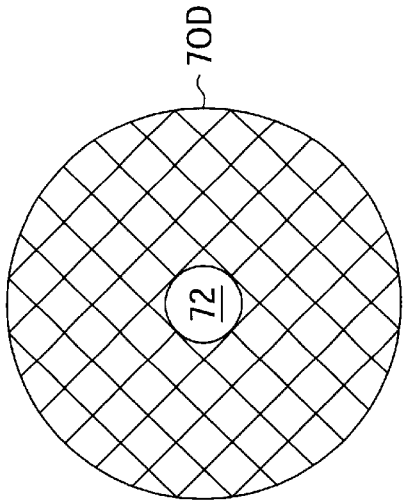
Figure 4C:
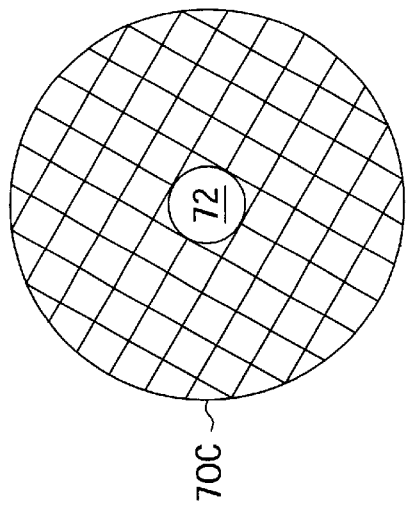
Figure 4D:
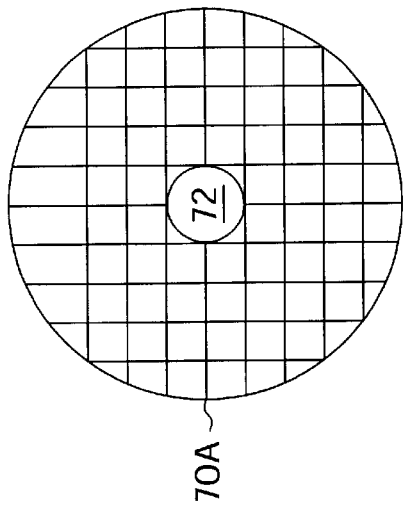

When the piston 46 reaches TDC at the completion of this stroke, the connection rod eccentric 50 as shown in FIGS. 3A–3C, or the multi-link eccentric shown in FIG. 6, is in position to produce the correct clearance volume in preparation for the vapor power stroke. This clearance volume is preferably considerably smaller than the clearance volume attained at the end of the compression stroke, as explained in further detail below with reference to FIGS. 3A–3C and FIG. 6. This is to allow for the more complete expansion of the vapor during the vapor power stroke, for example on the order of 20:1 or greater, depending on the application. A higher expansion ratio maximizes recovery of the mechanical work recoverable from the vapor.

FIG. 2E illustrates the vapor power stroke. During this stroke, the exhaust valve 40 is closed and the transfer valve 28 is open and the intake valve and vapor exhaust valve are closed. This stroke is initiated when fluid is injected through fluid injection device 38 into the vapor heating chamber 34, onto the heat regenerator 36 at the completion of the exhaust stroke. Vapor formed in vapor heating chamber 34 passes into the cylinder via transfer valve 28 and is expanded as piston 46 undergoes downward travel.

Note that in the configuration of FIG. 2E, with the exhaust valve 40 in a closed position, and the transfer valve 28 open with the heat regenerator 36 attached thereto, a small space 35 is formed within the vapor heating chamber 34 between the top of the heat regenerator 36 and the bottom of the exhaust valve 40. In a preferred embodiment, it is into this small space 35 that the fluid is injected from fluid injection device 38.

In the aforementioned embodiment wherein the fluid injected into the heat regenerator is liquid, the fluid injection device 38 may comprise an injection nozzle providing high pressure liquid from a pump. In an embodiment where the fluid injected into the heat regenerator is a cool, high pressure vapor, the fluid injection device 38 may comprise a valve mechanism coupled to a reservoir of cool, high pressure vapor. The reservoir would be filled by a compressor which preferably compresses the vapor in an isothermal fashion so as to produce a cool, high pressure vapor.

When fluid is injected into the heat regenerator 36, it is preferably injected proximal to its top portion, nearest the exhaust valve 40, and opposite the transfer valve 28. In this manner, the vapor 60 is heated as it passes through the body of the heat regenerator 36, past transfer valve 28, and into the cylinder combustion region 68. The vapor 60 entering the combustion region 68 is therefore at approximately the temperature of the hottest portion of the heat regenerator 36.

At the outset of vapor expansion, the volume in which the vapor is formed comprises the sum of a first volume of the vapor heating chamber 34, and a second volume defined by the piston top 64 and the cylinder head 62. To provide for maximum expansion of the vapor, and corresponding maximum initial vapor pressure, the second volume is preferably minimized mechanically, to provide a minimal clearance volume, thereby maximizing efficiency.

Likewise, the volume of the vapor heating chamber 34 comprises the volume defined between the transfer valve 28 and exhaust valve 40, minus the volume of the heat regenerator 36. Increasing the volume of the heat regenerator 36 reduces the volume of the vapor heating chamber 34, thereby providing maximal vapor expansion during the vapor power stroke. However, adequate flow area for the products of combustion through the heat regenerator should also be maintained.

In FIG. 2F, the piston experiences upward travel during the vapor exhaust stroke. The vapor exhaust valve 30 is open and the vapor is expelled into the vapor exhaust port 32. If liquid was injected at the beginning of the vapor power stroke, this exhausted vapor may be directed to a condenser to recover the liquid for use in a subsequent vapor engine cycle.

FIGS. 3A–3C are sectional side views of the cylinder of FIG. 1, illustrating the respective positions of the piston and connecting rod eccentric at the top dead center (TDC) position at the end of the vapor exhaust stroke (FIG. 3A), the end of the fuel compression stroke (FIG. 3B), and the end of the fuel exhaust stroke (FIG. 3C), in accordance with the present invention.

As shown in FIG. 3C, the connecting rod eccentric 50 is configured such that the piston position at the end of the fuel exhaust stroke shown in FIG. 2D minimizes the volume between the top surface 64 of the piston 46 and the cylinder head 62. This allows for maximum expansion of the vapor during the vapor power stoke of FIG. 2E.

As shown in FIG. 3B, when the piston reaches TDC at the end of the fuel compression stroke of FIG. 2B, the connecting rod eccentric is configured such that the clearance volume between the top surface 64 of the piston 46 and the cylinder head 62 provide for a suitable compression of air-fuel mixture. Typically, this clearance volume comprises approximately 10% of the total cylinder volume for an engine utilizing spark ignition of an air-fuel mixture.

As shown in FIG. 3A, a certain degree of flexibility exists for the configuration of the connecting rod eccentric when the piston reaches TDC at the end of the vapor exhaust stroke of FIG. 2F. For example, in FIG. 3A, the piston 46 is shown at a TDC position which is the same as that of the TDC at the end of the fuel compression stroke. Note that the TDC position of the piston 46 at the end of the vapor exhaust stroke need not be the same as the TDC position of the piston 46 at the end of the fuel compression stroke. This flexibility in piston position is permissive of alternative designs and configurations.

The connecting rod eccentric 50, used to control the clearance volume each time the piston reaches TDC during the six-stroke cycle, may comprise a planetary gear arrangement whereby the crankshaft rod journal serves as a rotating sun gear, the connecting rod big end serves as the stationary outer planetary gear, with numerous inner planetary gears positioned between the sun gear and the outer planetary gear. The center of the sun gear may be displaced from the center of the outer planetary gear, and the inner planetary gears may comprise various sizes. In this arrangement, as the sun gear rotates due to crankshaft rotation, the inner planetary gears rotate with respect to the fixed outer planetary gear. Due to the displacement of the sun gear center with respect to the outer planetary gear center, an eccentric motion is produced. By proportioning the sizes of the sun gear and the outer planetary gear, the eccentric can be configured to cycle either once for every three crankshaft rotations or twice for every three crankshaft rotations. Either configuration would allow for the desired control of the combustion chamber clearance volume each time the piston reaches TDC during the six-stroke cycle.

With reference to the second preferred embodiment illustrated in FIG. 6, the multi-link eccentric, used to control the clearance volume each time the piston reaches TDC during the six-stroke cycle, consists of an upper connecting rod 44 hinged to the piston 46, a lower connecting rod 90 hinged to the crankshaft 96, and a lever 92 hinged to both the upper connecting rod 44 and the lower connecting rod 90. The lever 92 is additionally connected to an eccentric 94 rotatably supported, for instance via a plurality of shaft bearings, by the engine block. The eccentric 94 is connected to the crankshaft 96 by gears or a chain and gear arrangement (not shown) such that the eccentric 94 rotates one revolution for each three revolutions of the crankshaft. Alternatively the eccentric can be geared to rotate two revolutions for each three revolutions of the crankshaft. Either gearing would allow for the desired control of the combustion chamber clearance volume each time the piston reaches TDC during the six-stroke cycle. As noted, mechanisms of this type have previously been employed for semi-static clearance volume control. In this embodiment, the mechanism is dynamically controlled by gearing the eccentric to the crankshaft.

The eccentric 94 is preferably configured such that the piston position at the end of the fuel exhaust stroke shown in FIG. 2D minimizes the volume between the top surface of the piston 64 and the cylinder head 62. This allows for the maximum expansion of the vapor during the vapor power stroke of FIG. 2E.

When the piston reaches TDC at the end of the fuel compression stroke of FIG. 2B, the eccentric 94 is configured such that the clearance volume between the top surface 64 of the piston 46 and the cylinder head 62 provides for a suitable compression of the air-fuel mixture. Typically, this clearance volume comprises approximately 10% of the total cylinder volume for an engine utilizing spark ignition of the air-fuel mixture.

The transfer valve 28, the exhaust valve 40, and the heat regenerator 36 may be all located coaxially, with the transfer valve 28 and exhaust valve 40 slidable relative to each other. This configuration allows for a relatively small vapor heating chamber 34, advantageous for maximum expansion of the vapor during the vapor power stroke. Use of a small vapor heating chamber will require a small heat regenerator, which preferably has a favorable convective heat transfer capability to extract a majority of the heat contained in the exhausted combustion gases. This favorable convective heat transfer is produced by promoting turbulent flow in the heat regenerator.

The heat regenerator can be formed in a number of configurations and of different materials. In a first embodiment, the heat regenerator may comprise a stack of overlapping metal wire mesh, as shown in FIGS. 4A–4D. The overlapping architecture significantly increases the convective heat transfer by reducing the length of laminar gas flow. In a second form, the heat regenerator may employ sintered metal. In this embodiment, powdered metal, possibly combined with a binder, is pressed into the shape of the desired heat regenerator. The piece is then heated, evaporating any binder, and the metallic powder is sintered into an irregular arrangement in the shape of the heat regenerator. This irregular arrangement of metallic pieces provides a large surface area for heat storage, provides adequate volume for gas flow, and promotes turbulent gas flow to produce maximum heat transfer between the exhaust products and the metal of the heat regenerator. For both the metal wire mesh embodiment and the sintered metal embodiment, a metal composition is chosen to withstand the maximum temperature of which it is exposed and further avoids corrosion when exposed to the vapor. Stainless steel, or other metals having a high melting point and resistance to corrosion may be employed for this purpose.

In a third embodiment, the heat regenerator may comprise a ceramic open cell foam. A ceramic foam is a material whereby irregular voids are produced within a solid ceramic. As with the sintered metal form, this arrangement provides a large surface area for heat storage, provides adequate flow volume for gas flow, and promotes turbulent gas flow.

In a fourth embodiment, the heat regenerator may comprise a patterned foil which is wrapped into an annular form. As shown in U.S. Pat. No. 5,429,177, issued to Yaron, et al, incorporated herein by reference, this foil may be patterned to form narrow channels through which the fluids pass. These channels can be configured to promote rapid heat transfer and to provide for pressure equalization within the heat regenerator.

The proposed structural forms will produce a significant pressure drop across the heat regenerator 38 during the fuel exhaust stroke. The combustion gas at the onset of the fuel exhaust stroke is at a pressure significantly greater than atmospheric pressure, and this pressure can be utilized to force the exhaust gas through the heat regenerator 38.

The heat regenerator 38 is preferably suitably small in size, to allow for a relatively small vapor heating chamber 34, thereby providing for maximum vapor expansion during the vapor power stroke. The surface area must be sufficiently large for extracting as much heat from the products of combustion as the temperature differentials will permit. Turbulent air flow is preferably generated as the products of combustion pass through the exchanger elements, for efficient extraction of heat over a minimal distance. The turbulent flow is preferably created in a minimal pressure drop so as not to increase the work performed by the piston during the fuel exhaust stroke. It is the combination of the small vapor heating chamber 34 and the clearance volume control provided by either the connecting rod eccentric 50 or the multi-link eccentric 93 that allows for maximum recovery of the energy available in the steam.

A stack of wire mesh screens as shown in FIGS. 4A–4D are suitable for this purpose. Four layers of wire screens 70A–70D include a concentric hole 72 for mounting along the shaft of the transfer valve 28. The layers are preferably stacked at various rotation angles with respect to adjacent layers, to promote turbulence, and to minimize the distance of gas flow through the regenerator in a laminar manner. This turbulent flow serves to increase convective heat transfer. Although four mesh layers are used herein for the purpose of example, fewer, or many more, mesh layers may be employed, depending on the application.

Injection of fluid to produce the vapor power stroke serves not only to provide a power generation function but also to provide internal cooling to the engine. At the start of the vapor expansion stroke, the vapor is heated to a high temperature as it passes through the heat regenerator 38. Upon entering the cylinder 48, the vapor is initially at a higher temperature than the cylinder head 62, the piston top 64, and the cylinder walls. The surfaces are therefore heated by the vapor at this stage.

As the vapor expands, its temperature decreases, and assuming sufficient expansion, the vapor temperature will decrease to a value below the temperature of the cylinder head and walls, and piston top. Any vapor in contact with those surfaces at this point will extract heat and therefore provide a cooling function. For the embodiment where a liquid is injected, it may be advantageous for the vapor to expand to a point where it is no longer purely vapor, but also includes liquid. This liquid facilitates the extraction of heat from the cylinder head and walls and piston top, as the liquid is revaporized by contact with the relatively hotter surfaces.

The surfaces of the combustion chamber, including the top of the piston, the walls of the cylinder and the faces of the intake and exhaust valves, may be coated with an insulating material of low thermal conductivity and low thermal mass storage capability thereby reducing the amount of heat absorbed by these surfaces during the combustion phase and allowing a greater portion of the heat remaining at the completion of the power stroke to be transferred to the heat regenerator at a higher temperature. Such a configuration has a beneficial effect on the efficiency of the vapor cycle.

Since the engine is internally cooled, the engine may be surrounded by insulating material 20 to decrease the loss of heat to the atmosphere.

Fluids other than water can be used for the vapor power cycle. A mixture of water and a hydrocarbon fuel such as methanol can advantageously utilize the high temperatures of the heat regenerator. With temperatures greater than 1000 degrees F., the hydrocarbon fuel in the presence of steam and a catalyst undergoes a chemical reaction known as steam reformation. This endothermic reaction transforms the hydrocarbon fuel and the steam into hydrogen and carbon dioxide. These gases, along with additional steam, provide high pressure gas for the vapor power stroke. After these gases are expelled during the vapor exhaust stroke, the steam is condensed. The remaining hydrogen and carbon dioxide are then used as the fuel for the air-fuel mixture to be injected during the intake stroke.

A catalyst is beneficial for efficient steam reformation of the hydrocarbon fuel. Accordingly, the surfaces of the heat regenerator may be coated with suitable catalysts, such as zinc oxide or chromium oxide. The following numerical example details the operation of the engine. Assume a 500 cc cylinder, having a bore of 84 mm, a stroke of 90 mm, an intake valve of 38 mm, a transfer valve of 40 mm and a steam exhaust valve of 30 mm. The mass of air consumed at each intake stroke is equal to: 500 cc*(1.2 g/1000 cc)=0.6 g. The fuel consumed at an air-fuel ratio of 14.7 is equal to: 0.6 g/14.7=0.041 g. The energy content of the fuel is thus: 0.041 g*44 kJ/g=1800 J.

Assuming that the four-stroke combustion cycle can convert one-third of the fuel energy into mechanical work, the amount of work resulting from combustion is 600 J, and the amount of rejected heat is 1200 J. Evidence from low-heat-rejection diesel engines demonstrates that greater than 90% of the rejected heat can be discharged in the exhaust gases. Assuming this, the heat available for capture by the heat regenerator of the present invention is: 0.9*1200 J=1080 J.

Allowing for a 40 C. rise in temperature in the heat regenerator and a specific heat of 0.45 J/g-C., the required heat regenerator mass is: 1080/(40*0.45)=60 g. With a 50% solid structure, and a density of 7 g/cc, the resulting volume of the heat regenerator is: 60/(0.5*7)=17 cc.

The net volume into which the vapor is formed is the free volume of the heat regenerator plus the clearance volume between the piston and the cylinder head at the start of the vapor power stroke. The multi-link eccentric mechanism of FIG. 6 can reduce the clearance volume to 5.5 cc for a bore of 84 mm. This allows for a piston-to-cylinder head clearance of 1 mm. The expansion ratio during the vapor power stroke is thus:

$$\frac{(500 + 17(0.5) + 5.5)}{17(0.5) + 5.5} : 1, \text{ or } 36:1$$

The heat regenerator is preferably formed in an annular shape, with an outer diameter equal to the transfer valve diameter. The stem of the transfer valve preferably passes through the center of the annulus. For a 40 mm outer diameter, allowing for a 10 mm inner diameter, the height of the heat regenerator is:

$$\frac{17 \text{ cc}}{3.14(4(4) - 1(1))/4} = 16 \text{ mm}$$

The efficiency of the vapor cycle is governed by the following relationship:

$$\text{Efficiency} = \frac{1 - \left(\frac{V_1}{V_2}\right)^{K-1}}{1 + \frac{\left(\frac{H_b}{C_p} - T_b\right)}{T_1}}$$

where $V_1/V_2$ is the expansion ratio, K is the polytropic coefficient, $H_b$ is the heat of vaporization of the fluid, $C_p$ is the specific heat of the vaporized fluid, $T_b$ is the temperature of vaporization, and $T_1$ is the temperature at the start of expansion. This relationship assumes the expanding vapor to be an ideal gas with constant specific heat.

With water used as the fluid for the vapor cycle, the following parameters apply: $V_1/V_2$=1/36; K=1.33; $H_b$=2.26 kJ/g; $C_p$=1.87 J/g-C; and $T_b$=410 degrees Kelvin. The resulting efficiency relationship is $0.69/(1+800/T_1)$. Assuming this, the mass of water necessary for each cycle is:

$$\text{Mass} = \frac{\text{energy absorbed}}{1.87(T_1 + 800)}.$$

Assuming $T_1=1300$ Kelvin, then Mass=$1080/(1.87*(1300+800))$=0.275 g; and Efficiency=$0.69/(1+800/1300)$=0.427.

The mechanical power produced by the vapor cycle is thus $1080*0.427=461$ J, and the total engine efficiency is $(600+461)/1800=58.9\%$.

While this invention has been particularly shown and described with references to preferred embodiments thereof, it will be understood by those skilled in the art that various changes in form and details may be made therein without departing from the spirit and scope of the invention as defined by the appended claims.

For example, in the foregoing description, poppet-type valves are employed. Other valve types, including sleeve or rotary valves are equally applicable to the present invention.

Although the preferred embodiment described above refers to a six-stroke cycle, an alternative embodiment, equally applicable to the present invention, comprises a four-stroke cycle including a compression stroke, a fuel power stroke, a fuel exhaust stroke, and a vapor power stroke.

At the end of the vapor power stroke, when the piston nears its lowest point of travel, for example near a position referred to as bottom dead center, the intake valve 22 and vapor exhaust valve 30 can be opened. A pressurized intake mixture may be forced into the cylinder through the intake valve 22, and vapor from the vapor power stroke is forced out the vapor exhaust valve 30. Although interaction of the intake mixture and the vapor exhaust would occur, such interaction would be minimal. The compression stroke begins by closing the intake valve 22 and the vapor exhaust valve 30, followed by upward travel of the piston, thereby compressing the mixture.

During the fuel power stroke, the compressed intake mixture is ignited, causing the piston to move downward.

During the fuel exhaust stroke, the transfer valve 28 is opened and the combustion products are forced out the transfer valve 28 through the heat regenerator 36 as the piston undergoes upward travel.

During the vapor power stroke, fluid is injected into the heat regenerator 36 as described above and the resulting heated vapor causes the piston to undergo downward travel, thereby initiating a vapor power stroke.

In the four-stroke cycle described above, a greater percentage of the cycle involves power stroke, as compared to the six-stroke cycle. This four-stroke cycle can be readily modified to operate as a Miller cycle, wherein the expansion ratio of the fuel power stroke is greater than the compression ratio of the fuel compression stroke. This is beneficial for extracting energy from the fuel power stroke.

Other multiple-stroke cycle configurations are equally applicable to the present invention.

I claim:

1. An internal combustion engine comprising:
  a fuel combustion chamber having an exhaust port at which heated fuel exhaust generated by combustion is released from said chamber;
  a heat regenerator comprising a heat conductive element configured to promote turbulent flow of said fuel exhaust therethrough in communication with said exhaust port for extraction of heat from the fuel exhaust;
  a fluid source for releasing a fluid into the heat regenerator, whereby the fluid absorbs said heat and forms a heated vapor;
  a heat transfer valve for controlling the release of said vapor into said chamber for powering the engine; and
  wherein the volume of the fuel combustion chamber is controllable such that a first volume of the chamber at the initiation of combustion is different than a second volume of the chamber at the initiation of the release of said vapor.

2. The internal combustion engine of claim 1 wherein said fluid comprises water and said vapor comprises steam.

3. The internal combustion engine of claim 2 wherein said released vapor generates a vapor charge in said chamber for powering the engine.

4. The internal combustion engine of claim 1 wherein said fluid comprises a mixture of water and a hydrocarbon fuel.

5. The internal combustion engine of claim 1 wherein the fluid and vapor are at high pressure.

6. The internal combustion engine of claim 1 wherein said fluid comprises a low temperature, high pressure vapor.

7. The internal combustion engine of claim 1 wherein said vapor charge is generated following a fuel charge which powers the engine and produces said fuel exhaust.

8. The internal combustion engine of claim 1 wherein said heat conductive element comprises a plurality of wire mesh elements stacked at various rotation angles.

9. The internal combustion engine of claim 8 wherein said wire mesh elements include a concentric hole for mounting to a shaft of said heat exchange valve.

10. The internal combustion engine of claim 8 wherein said wire mesh elements are formed of a material selected from the group of materials consisting of stainless steel and ceramic.

11. The internal combustion engine of claim 1 wherein the heat conductive element comprises a material selected from the group of materials consisting of: a sintered metal, an open cell-ceramic, a metal foil, and a patterned foil wound into an annular shape.

12. The internal combustion engine of claim 1 further comprising an exhaust valve for controlling the release of fuel exhaust from said heat regenerator.

13. The internal combustion engine of claim 12 wherein said exhaust valve includes a shaft which is coaxial with and slidable relative to a shaft of said heat transfer valve, and wherein said heat regenerator is positioned between said exhaust valve and said heat transfer valve.

14. The internal combustion engine of claim 12 wherein said exhaust valve and said heat transfer valve comprise poppet valves.

15. The internal combustion engine of claim 12 wherein the heat regenerator is enclosed in a vapor heating chamber in communication with said exhaust valve, said fluid source, and said heat transfer valve.

16. The internal combustion engine of claim 1 wherein the first and second volumes are controlled by the top dead center position of a piston coupled to an eccentric.

17. The internal combustion engine of claim 1 wherein the first and second volumes are controlled by a piston coupled to a multi-link eccentric mechanism.

18. The internal combustion engine of claim 17 wherein the multi-link eccentric mechanism comprises:
  an eccentric mechanism adapted to be coupled to, and driven by, an engine crank shaft;
  upper and lower connecting rods; and
  a lever coupled between the upper and lower connecting rods and the eccentric mechanism.

19. The internal combustion engine of claim 18 wherein the eccentric mechanism is rotatably supported by a plurality of shaft bearings.

20. The internal combustion engine of claim 18 further comprising a gearing mechanism for gearing the eccentric relative to the crank shaft.

21. The heat regenerator of claim 1 further comprising a vapor heating chamber enclosing said heat conductive element, said vapor heating chamber isolated at entry and exit ports by valves.

22. The heat regenerator of claim 21 wherein the entry port of the vapor heating chamber is coupled to a fuel combustion chamber of an internal combustion engine via said entry port valve, said fuel combustion chamber generating said combustion exhaust and receiving said heated vapor for powering said engine.

23. The heat regenerator of claim 22 wherein the vapor heating chamber volume minus the heat regenerator volume is less than the volume of the fuel combustion chamber at the onset of combustion.

24. The heat regenerator of claim 22 wherein the heat regenerator is coupled proximal to the fuel combustion chamber so as to minimize heat loss during the transfer of combustion gas from the fuel combustion chamber to the heat regenerator, and during the transfer of vapor from the heat regenerator to the fuel combustion chamber.

25. The heat regenerator of claim 22 wherein the vapor heating chamber and the fuel combustion chamber are configured such that vapor heating occurs at a substantially constant volume.

26. An internal combustion engine comprising:
 a fuel combustion chamber having an exhaust port at which heated fuel exhaust generated by combustion is released from said chamber;
 a heat regenerator in communication with said exhaust port for extraction of heat from the fuel exhaust;
 a fluid source for releasing a fluid into the heat regenerator, whereby the fluid absorbs said heat and forms a heated vapor; and
 a heat transfer valve for controlling the release of said vapor into said chamber for powering the engine;
 wherein the volume of the fuel combustion chamber is controllable such that a first volume of the chamber at the initiation of combustion is different than a second volume of the chamber at the initiation of the release of said vapor.

* * * * *